(12) United States Patent
Esau

(10) Patent No.: US 12,227,217 B1
(45) Date of Patent: Feb. 18, 2025

(54) CART FOR MOVING AND STORING FOLDING TABLES

(71) Applicant: LaVerne Alvin Esau, Hillsboro, KS (US)

(72) Inventor: LaVerne Alvin Esau, Hillsboro, KS (US)

( * ) Notice: Subject to any disclaimer, the term of this patent is extended or adjusted under 35 U.S.C. 154(b) by 212 days.

(21) Appl. No.: 17/502,964

(22) Filed: Oct. 15, 2021

Related U.S. Application Data

(60) Provisional application No. 63/092,982, filed on Oct. 16, 2020.

(51) Int. Cl.
*B62B 3/10* (2006.01)

(52) U.S. Cl.
CPC .......... *B62B 3/108* (2013.01); *B62B 2202/30* (2013.01)

(58) Field of Classification Search
CPC .. B62B 3/108; B62B 3/00; B62B 3/10; B62B 2202/30; B62B 2202/00
See application file for complete search history.

(56) References Cited

U.S. PATENT DOCUMENTS

| | | | | |
|---|---|---|---|---|
| 2,621,815 A * | 12/1952 | Gannon | ................ | B62B 3/108 211/20 |
| 3,031,084 A * | 4/1962 | Mugler | ................ | A47B 7/02 108/16 |
| 5,037,117 A * | 8/1991 | Hershberger | ........ | B62B 3/108 280/35 |
| 6,250,655 B1 * | 6/2001 | Sheeks | ................ | B62B 3/108 280/652 |
| 6,296,262 B1 * | 10/2001 | Skinner | ................ | B62B 3/108 280/35 |
| 6,454,282 B2 * | 9/2002 | Sexton | ................ | B62B 3/108 280/47.35 |
| 7,527,274 B2 * | 5/2009 | Strauss | ................ | B65G 49/062 211/41.15 |
| 7,992,883 B2 * | 8/2011 | Brandon | ................ | B62B 3/108 280/47.34 |
| 9,809,241 B2 * | 11/2017 | Polidoros | ................ | B62B 3/108 |
| 9,908,548 B1 * | 3/2018 | Yu | ................ | B62B 3/108 |
| 12,077,203 B2 * | 9/2024 | Huang | ................ | B62B 3/04 |
| 2002/0109316 A1 * | 8/2002 | Cassidy | ................ | B62B 3/108 280/33.998 |
| 2012/0177468 A1 * | 7/2012 | Dickey | ................ | B62B 3/108 414/812 |

* cited by examiner

*Primary Examiner* — James M Dolak
(74) *Attorney, Agent, or Firm* — Robert Blinn

(57) ABSTRACT

A table cart for holding and carrying folding tables includes a base and a table rack having at least one horizontal member. The base includes two parallel supports for receiving the bottom edges of folding tables. The table rack is mounted to the base and has at least one upright member and at least one horizontal member that is mounted at the top of the upright member. The at least one horizontal member includes a plurality of tabs that are slidably and frictionally mounted to the at least one horizontal member so that they are able to be manually urged between a first raised, position suitable for permitting the upper edge of a folding table to pass below the tab, and a second, lowered position such that the lower end of the tab blocks the passage of upper edge of a folding table thereby preventing the racked table from tipping.

7 Claims, 12 Drawing Sheets

CART FOR MOVING AND STORING FOLDING TABLES

CROSS REFERENCES TO RELATED APPLICATIONS

This application claims the benefit of U.S. Provisional Patent Application No. 63/092,982 which was filed on Oct. 16, 2020, which is incorporated herein by reference, as if repeated in its entirety hereinafter.

FIELD OF THE INVENTION

This invention relates to a cart for moving and storing folding tables.

BACKGROUND OF THE INVENTION

Folding tables are often deployed for temporary use. Therefore, it is often necessary to fold up folding tables and store them. The prior art teaches various carts that are able to receive and hold folding tables. Typically, such carts are supported by wheels that facilitate the movement of tables from an area of temporary use to a storage room or the like. Often it is difficult to maintain folding tables that are arranged on a cart in a stable and secure condition. What is needed is table cart that receives and holds folding tables in a stable and secure manner.

SUMMARY

The above noted need is addressed by a table cart for carrying and storing folding tables that includes a base and a table rack. By "folding table", the applicant means the type of table that presents a flat table top and that is supported by leg structures that are able to be secured in a folded, storage position in which the legs structures are stowed parallel to and in close proximity to the underside of the table top and wherein the leg structures may be released and pivoted into an extended position suitable for supporting the table top for use. The base of the table cart presents two parallel supports that are arranged to receive the bottom edges of folding tables that have been folded into the storage position and placed in an upright fashion on the parallel supports so that the tables are generally perpendicular to the parallel supports. The table rack is mounted to the base and includes at least one upright member and a generally horizontal table racking assembly. The table racking assembly includes at least one horizontal member that is mounted to the upper end of the upright member. A plurality of tabs are slidably mounted to the at least one horizontal member for vertical movement between a first, raised position and a second lowered position. The first, raised position is suitable for permitting the upper edge of a folding table to pass under the tab and under the horizontal member. The second, lowered position is suitable for blocking the passage of the upper edge of a folding table thereby preventing the folding table from tilting away from the racked, upright position. After a table is folded and placed in an upright racked position and tilted under a tab, the tab may then be manually urged from the first, raised position to the second, lowered position such that the upper edge of the table is secured from tilting away from its secured position. This racking process can be repeated for a plurality of tables until all of the tabs have been extended to secure the upper edge of a corresponding table.

DETAILED DESCRIPTION

Figure 1:
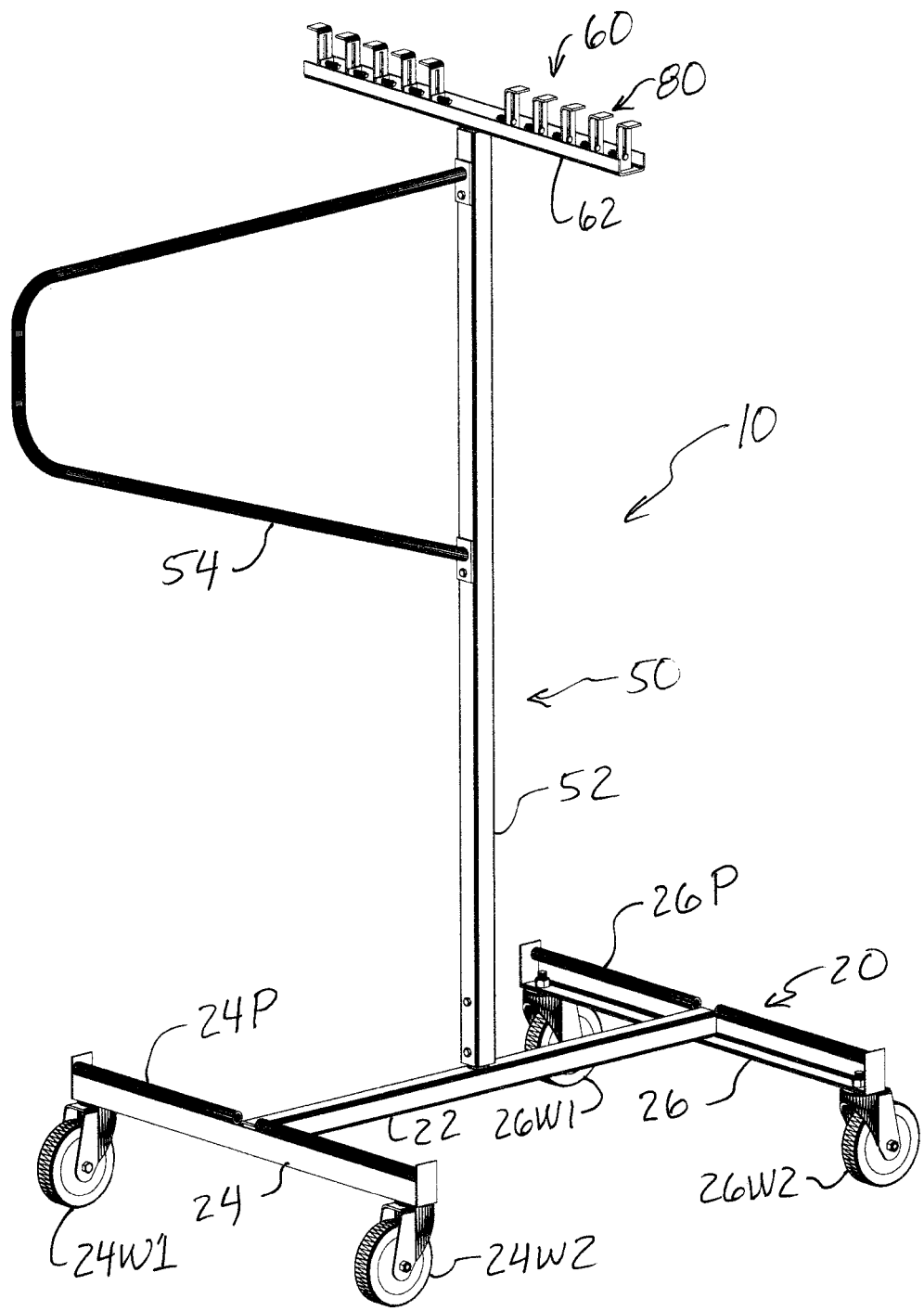
FIG. 1 is a perspective view of one embodiment of the table cart.

Referring to the figures, FIG. 1 provides a perspective view of one embodiment of a table cart 10. As can be seen in FIG. 1, table cart 10 includes a base 20 and a table rack 50.

As is shown in FIGS. 1-4, base 20 of table cart 10 is arranged for supporting table cart 10 and also supporting a plurality of folded tables T (see FIG. 2) as well as providing a means for moving table cart 10 even when fully loaded. As can be seen in FIG. 1, in this example, base 20 includes a longitudinal member 22 that spans between two end members 24 and 26. In this example, upright table rack 50 is fixed to longitudinal member 22 near the midpoint of longitudinal member 22. End members 24 and 26 are arranged parallel to each other and are appropriately spaced to receive the lower edges of upright folded tables when such folded tables T are arranged so that they are generally oriented to be perpendicular to end members 24 and 26. A set of padded members 24P and 26P are fixed to the upper surfaces of end members 24 and 26 in order to receive the lower edges of folding tables without damaging those lower edges. Rubber is a preferred material for padded members 24P and 26P because a rubber surface will tend to prevent tables T from sliding. End member 24 presents two opposite caster wheels 24W1 and 24W2 and end member 26 presents correspondingly opposite caster wheels 26W1 and 26W2. Taken together, caster wheels 24W1, 24W2, 26W1 and 26W2 make it easy to roll table cart 10 across flat surfaces.

Figure 1A:
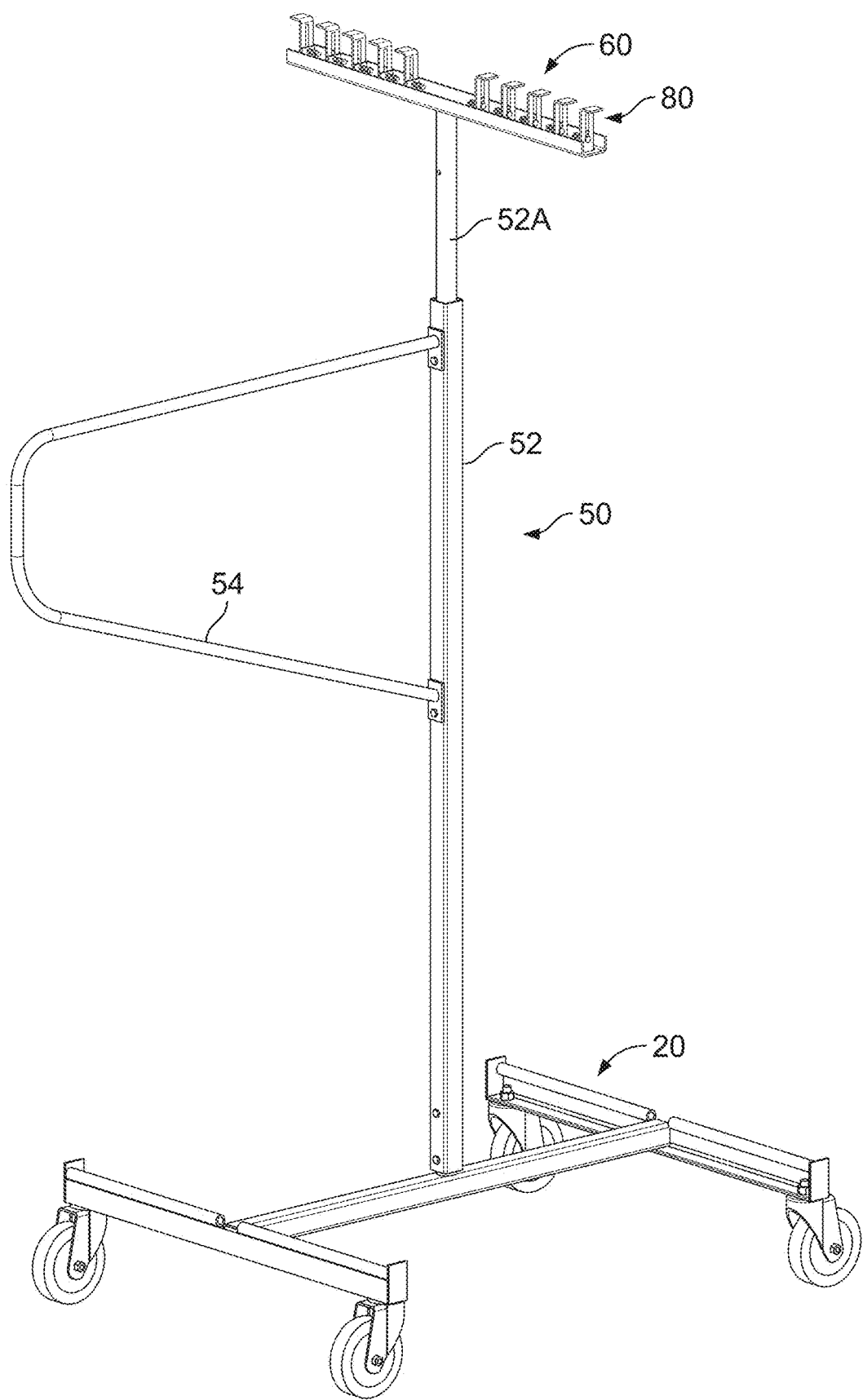
Figure 2:
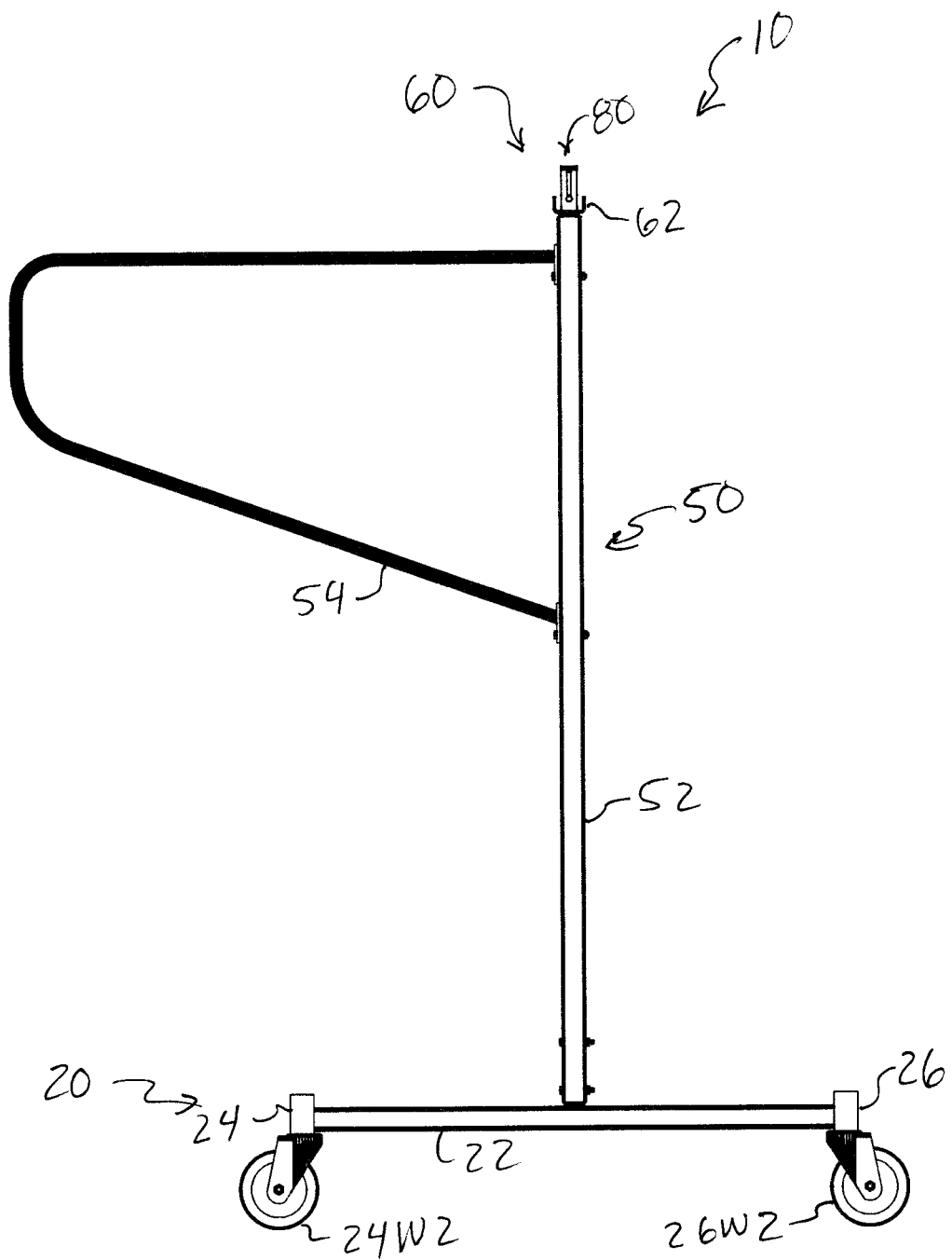
FIG. 2 is a side view of one embodiment of the table cart.
Figure 3:
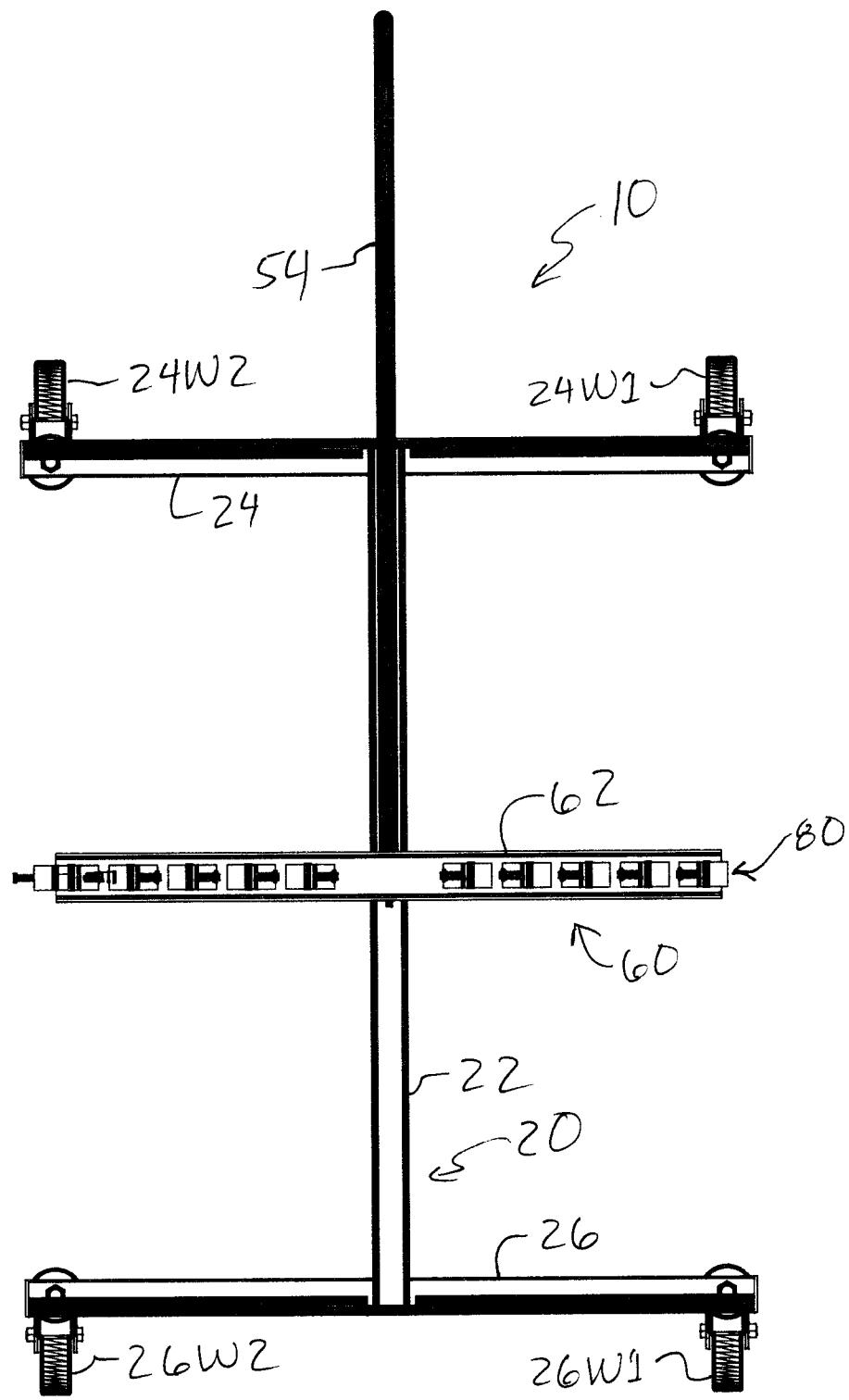
FIG. 3 is a top view of one embodiment of the table cart.

As is shown in FIGS. 1-4, table rack 50 of table cart 10 is a generally upright structure that is mounted to base 20 as noted above. As can be best seen in FIG. 1, table rack 50 includes an upright member 52, an optional handle member 54 and a table racking assembly 60. As noted above, upright member 52, in this example, is fixed at the center of longitudinal member 22 of base 20. The skilled reader will appreciate that the length of upright member 52 and the elevation of racking assembly 60 needs to correspond to a standard table diameter. Thus, the elevation of racking assembly 60 needs to be such that when the lower edge of table T is supported by end members 24 and 26, the upper edge of table T is close to but does not interfere with raised tabs 80 or the lower surface of horizontal members 62. Upright member 52 could be fashioned to be adjustable in length, or a manufacturer could choose to offer versions of table cart 10 which feature racking assemblies that have a fixed elevation that corresponds to a standard table diameter. FIG. 1A provides a view that shows how upright member 52 may also be an adjustable telescoping member. It is contemplated by the applicant, that in these examples, table cart 10 is able to accommodate two common sizes of circular folding tables, such as, for example, five food diameter tables and six-foot diameter tables, or even tables having other diameters. Thus, for example, when upright member 52 is in the first low position as shown in FIG. 1, it may be arranged so that table cart 10 is able to receive and secure five-foot diameter tables, and when upright member 52 is locked in the second raised position as shown in FIG. 1A, it may be arranged so that table cart 10 is able to receive and secure six-foot diameter tables. Or, it is also contemplated that upright member 52 can be configured to accommodate other tables of other diameters. The way in which upright member 52 may be locked in at least the second raised position, or other intermediate positions between the lower position and the higher position, could be one of many that are well known in the art.

As can be seen in FIG. 1, optional handle member 54 extends in a direction that is generally parallel to and even co-planar with longitudinal member 22 and perpendicular to end members 24 and 24 of base 20. Handle member 54 helps to guide the first folding table T on each side as they are loaded onto table cart 10. Handle member 54 also provides a handle for pushing table cart 10.

Figure 4:
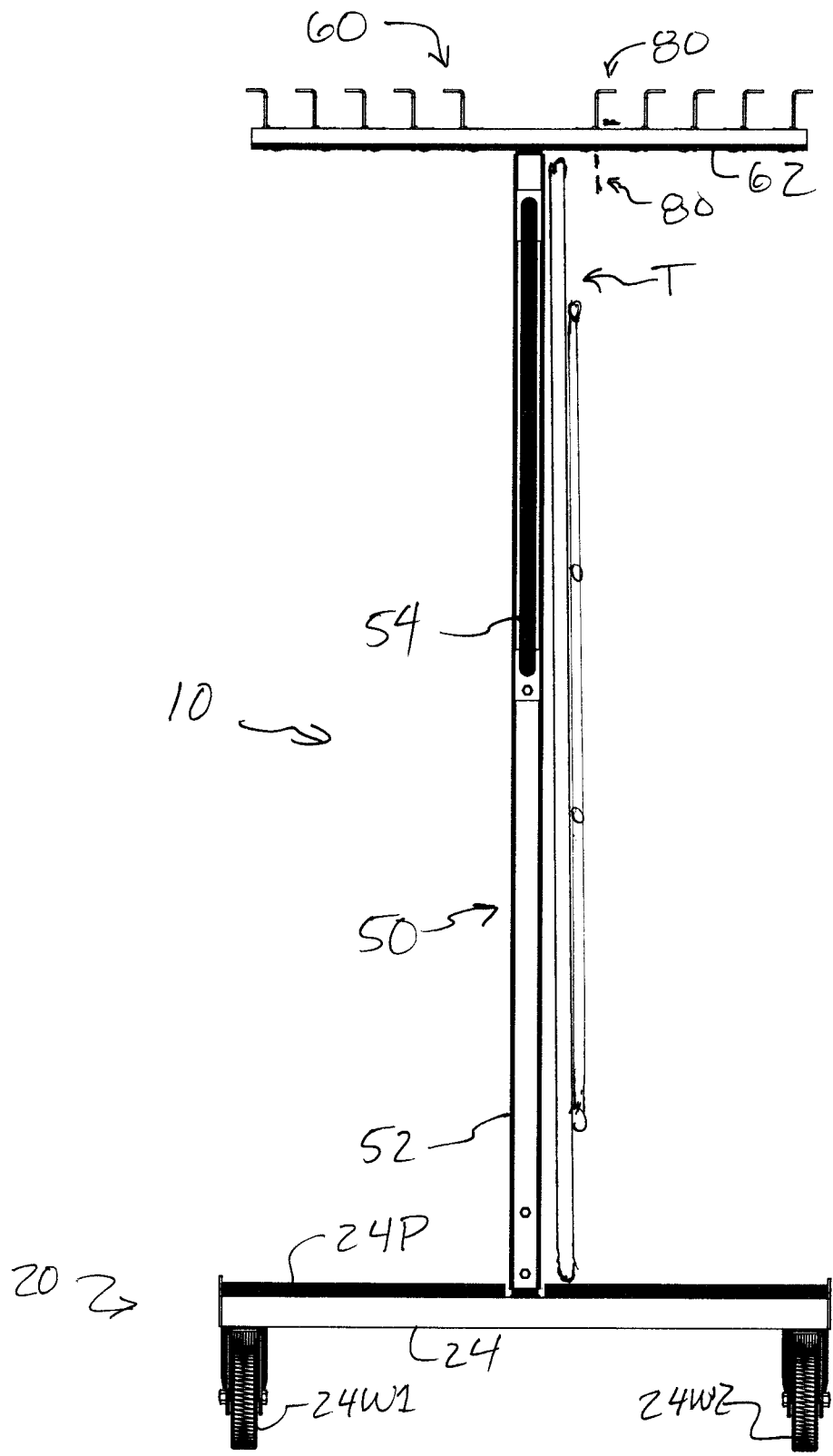
FIG. 4 is an end view of one embodiment of the table cart.
Figure 6:
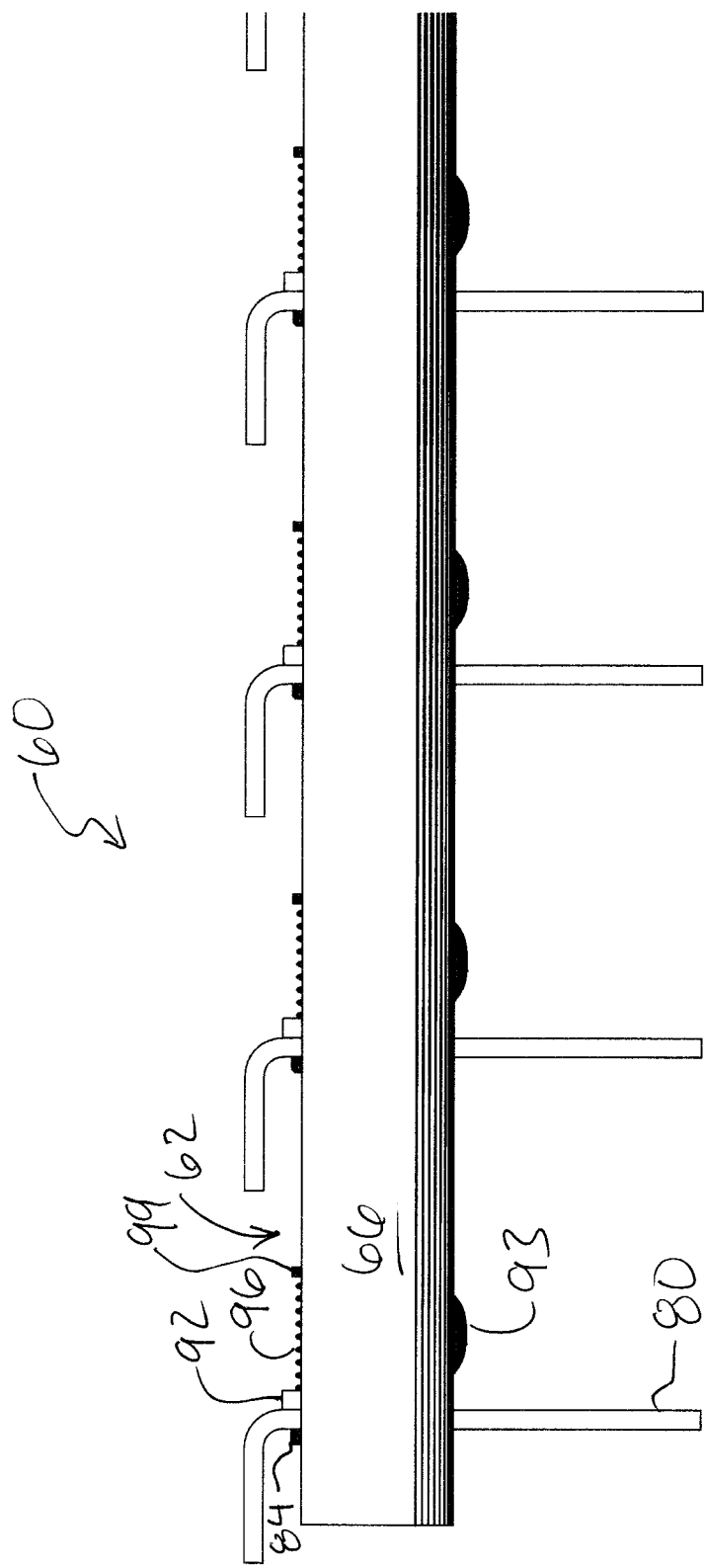
FIG. 6 is a second partial close up view of a portion of the horizontal member 62 of the rack assembly that also shows a plurality of tabs in the second, lowered position.
Figure 7:
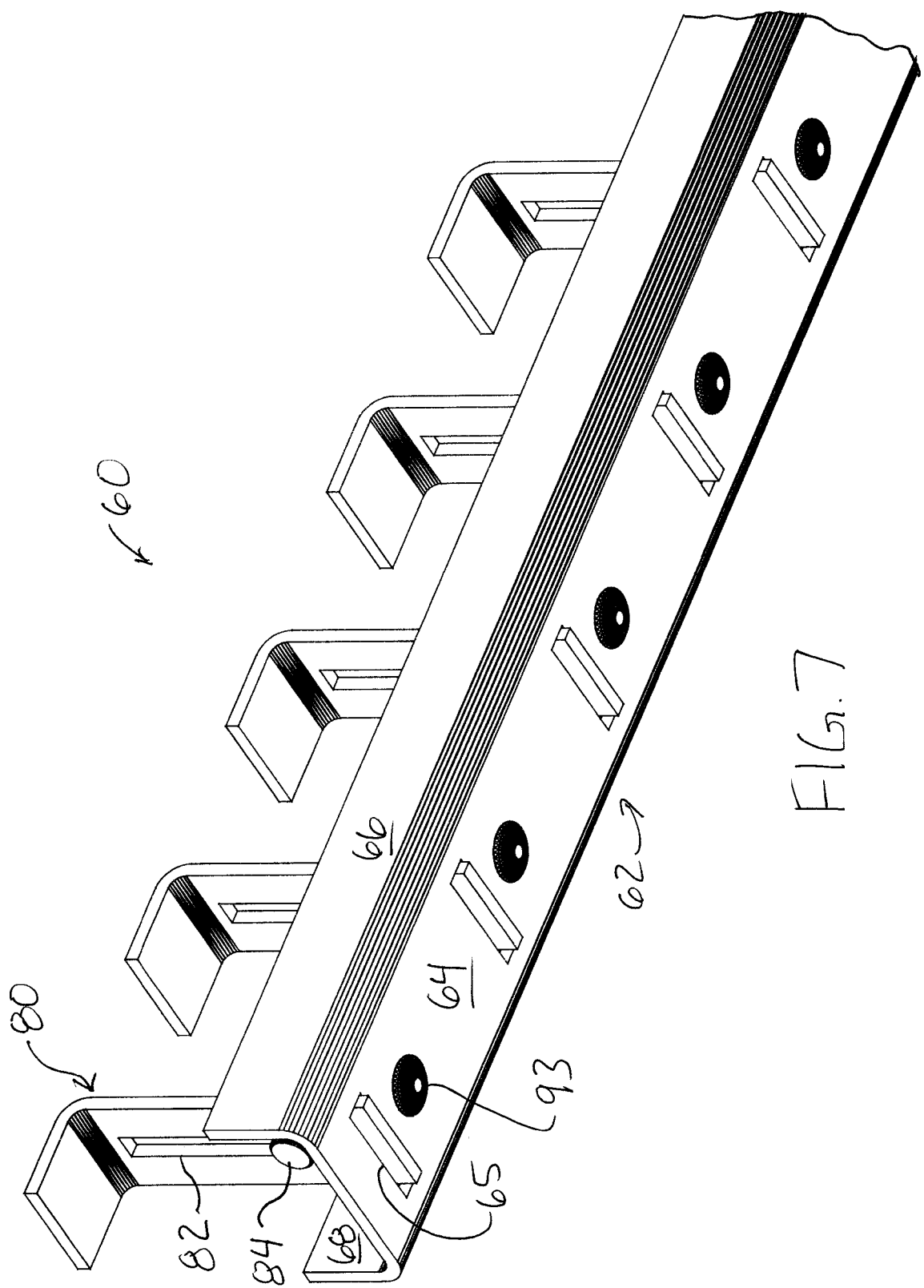
FIG. 7 is a partial close up perspective view of a portion of the horizontal member 62 of the rack assembly showing a plurality of tabs in the first, raised position.
Figure 8:
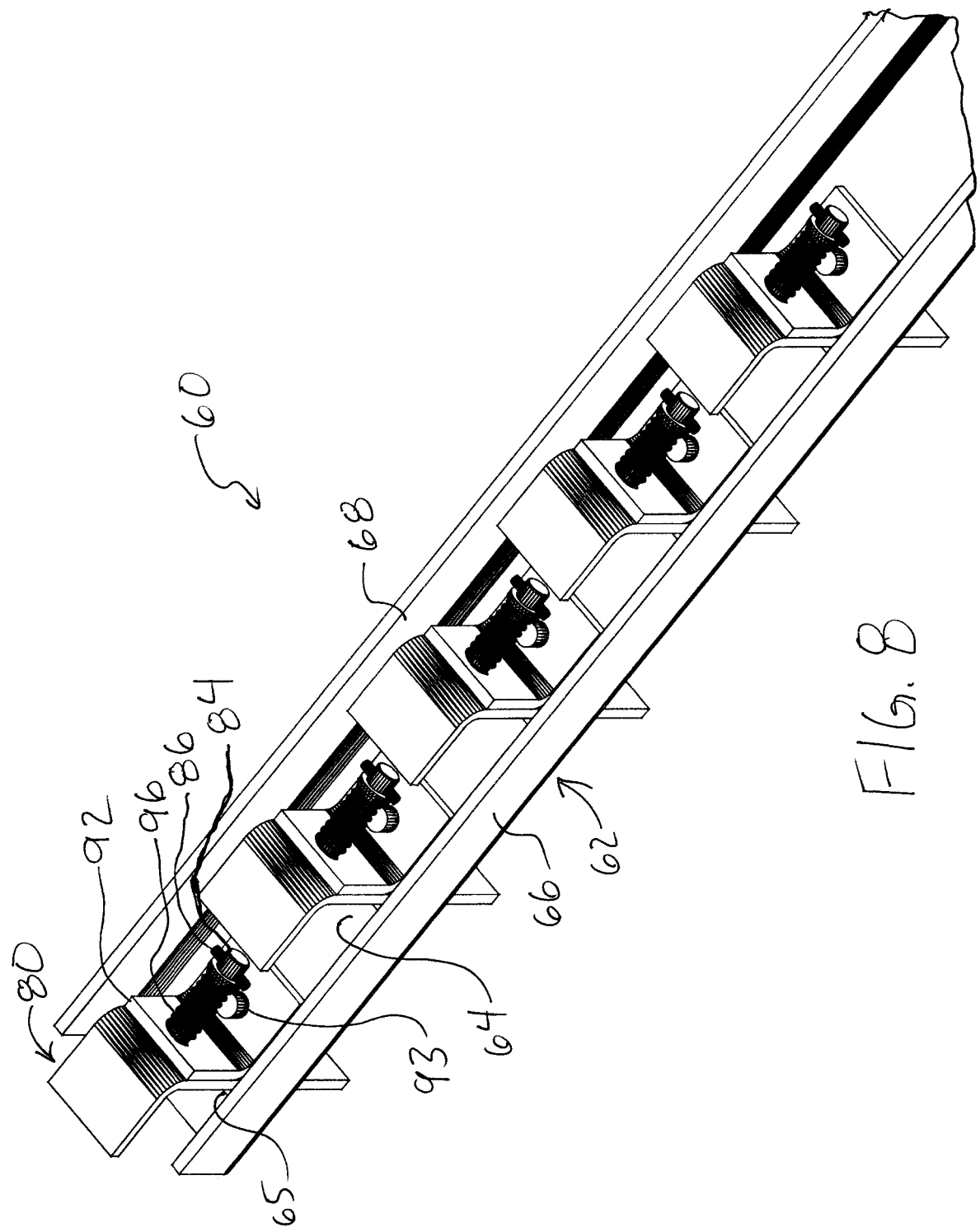
FIG. 8 is a partial close up perspective view of a portion of the horizontal member of the rack assembly showing a plurality of tabs in the second, lowered position.

Various aspects of racking assembly 60 are shown in all of the above noted figures, namely FIGS. 1-9. The purpose of racking assembly 60 is to provide a mechanism for securing the upper edges of upright, stowed folded tables from tipping away from their upright, stowed position as shown in FIG. 4. This is an important feature of table cart 10 and is very advantageous in terms of usefulness and safety. As can be best seen in FIG. 1, table racking assembly 60 includes a horizontal member 62 and a plurality of tabs. In this example, horizontal member 62 is mounted to the upper end of upright member 52. In this example, horizontal member 62 is fashioned from a channel that includes a base flange 64 and two upright flanges 66 and 68. As can be best seen in FIGS. 5-9, the plurality of tabs 80 are mounted to horizontal member 62. Each of the plurality of tabs 80 are mounted horizontal member 62 in a sliding fashion to an angle 92. Each angle 92 is fixed to base flange 64 of horizontal member 62 as shown in FIG. 8, in this example, by a fastener 93. As can be best seen in FIG. 9, tab 80 includes an upright flange 81 and relatively short upper flange 83 which is suitable for manual manipulation. Upright flange 81 also presents a central vertical slot 82 which will be discussed further below.

Figure 5:
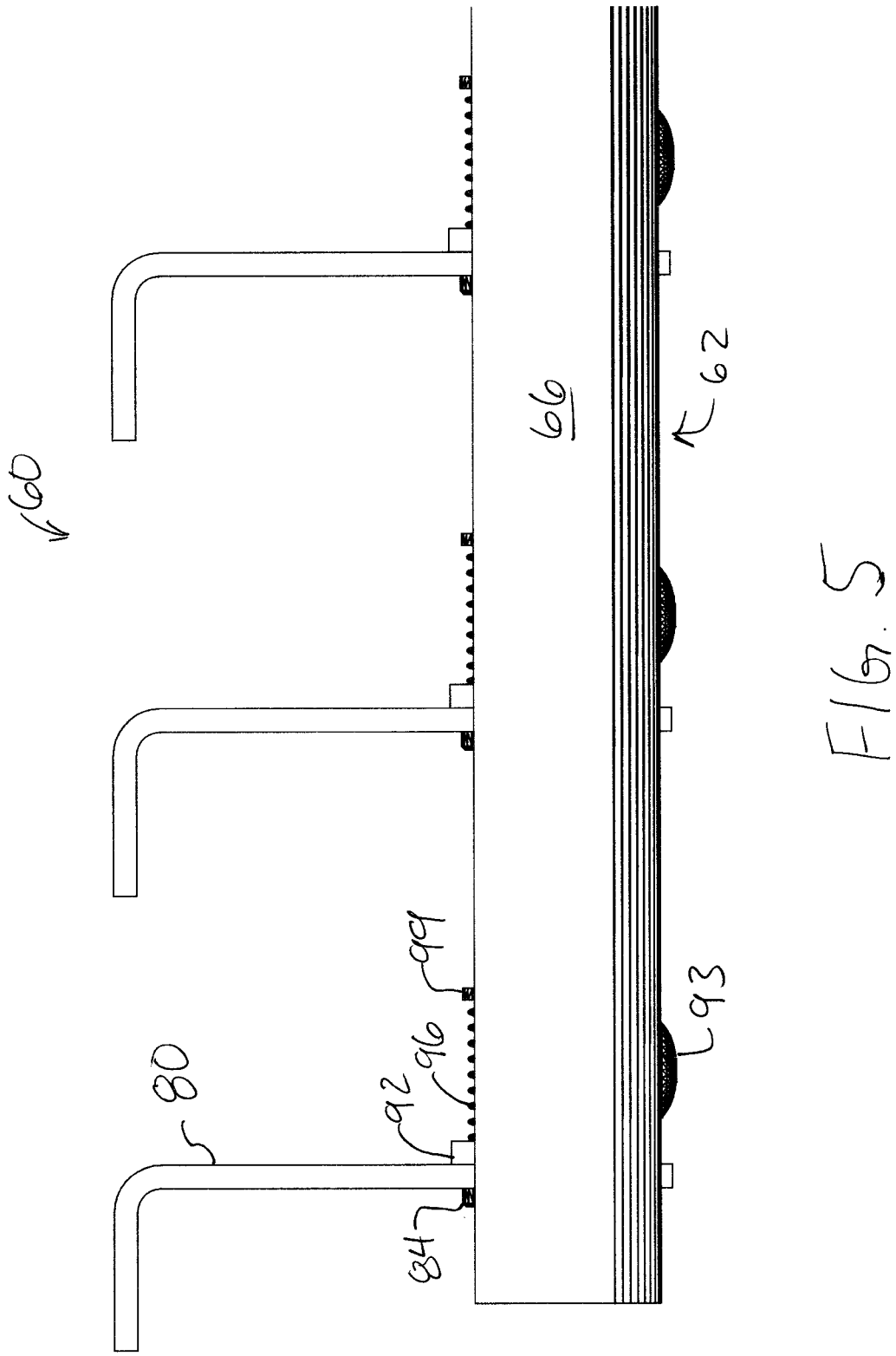
FIG. 5 is a partial close up side view of the horizontal member 62 of the rack assembly further showing a plurality of tabs in the first, raised position.
Figure 9:
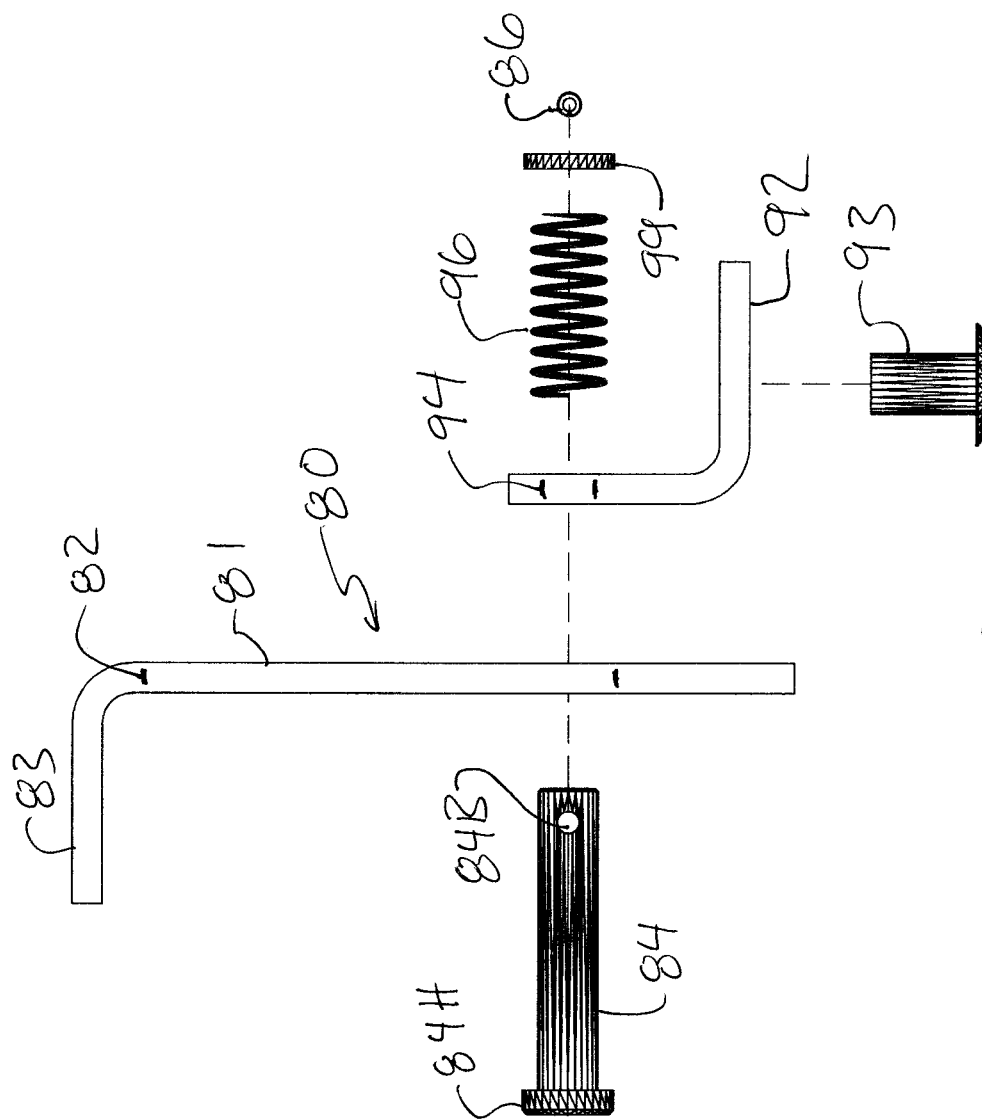
FIG. 9 is a magnified cut-away, exploded side view of a tab assembly.

The arrangement of tabs 80 in relation to horizontal member 62 is best understood by referring to FIGS. 7-9. FIG. 9 is an exploded cross section view that illustrates the arrangement of tabs 80. As can be seen in FIG. 9 and also by referring to FIG. 7, each tab 80 includes an upright flange 81 that presents a central vertical slot 82. A relatively short upper flange 83 which is suitable for facilitating the manual manipulation of tab 80 extends in a perpendicular fashion from the upper end of upright flange 81. Slot 82 is arranged to accommodate a fastener 84 in a sliding fashion. Fastener 84 may also be described as a pin. Fastener 84 has a flat head 84H at one end that is wider than slot 82 and a transverse bore 84B at the other end for receiving a retaining pin 86. In this example, an angle 92 is fixed to base flange 64 of horizontal member 62 and presents a hole 94 that is sized to slidably receive fastener 84. Thus, when fastener 84 is slid through slot 82 of tab 80 and through hole 94 of angle 92 as well as through a compression spring 96 and further through washer 98 and then pinned behind washer 98 by mounting pin 86 through bore 84B. Thus tab 80, because of the bias provided by compression spring 96, will be frictionally and slidably mounted to angle 92 and by extension also frictionally and slidably mounted to horizontal member 62. Thus, tab 80 is able to frictionally slide between an upper position as shown in FIG. 5 and a lower position as shown in FIG. 6. The vertical range of those upper and lower positions is determined by the length of slot 82. As may also be appreciated by referring to FIG. 7, the center horizontal flange 64 of horizontal member 62 presents a series of transverse slots 65 that are located and sized to allow passage of the upright flanges 81 of tabs 80 as tabs 80 are manually urged between a first raised position as shown in FIG. 5 and a second, lowered position as shown in FIG. 6.

As noted above, tabs 80 are mounted frictionally and slidably at least indirectly to horizontal member 62. In this example, compression spring 96 causes sufficient frictional force to allow an operator to place a tab 80 either in a raised position as shown in FIG. 5 or in a lowered position as shown in FIG. 6. Thus, it is possible to use tabs 80 to stabilize and maintain a folding table T as shown in FIG. 4, in a secure upright position by extending tab 80 from a first, raised position shown in solid lines in FIG. 4 to a second, lowered position shown with dashed lines in FIG. 4. As can be seen by referring to FIG. 4, the lower edge of tab 80 has descended sufficiently when in the second, lowered position, to prevent the passage of the upper edge of table T away from the upright secured positon for table T shown in FIG. 4. The same will be the case if additional tables are arranged on that side table cart 10 in a similar manner as shown in FIG. 4 and the other corresponding tabs 80 are similarly lowered and if still five more tables are arranged on the other side of table cart 10 also in a similar manner as is shown for table T in FIG. 4, the corresponding tabs 80 are also lowered. It may also be observed that when a tab 80 is in the second, lowered position, it also provides a stop for the upper edge of the next table that is loaded onto table cart 10.

The skilled reader will appreciate that the length of upright member 52 controls the elevation of horizontal member 62 above base 20. While upright member 52 can be made to be a telescoping member that is adjustable in height, the applicant contemplates that the most simple and robust design would be to fabricate table carts 10 that have upright members 52 of set, predetermined lengths that are appropriate for accommodating standard diameter folding tables. It is believed that there are two widely used standard diameter tables which have either a five foot or a six foot diameter.

The skilled reader will appreciate that all of the above may be fabricated from suitable strong rigid materials. The applicant has found that standard steel tubing and other standard steel stock materials provides the best material for the structural members described above.

Figure 10:
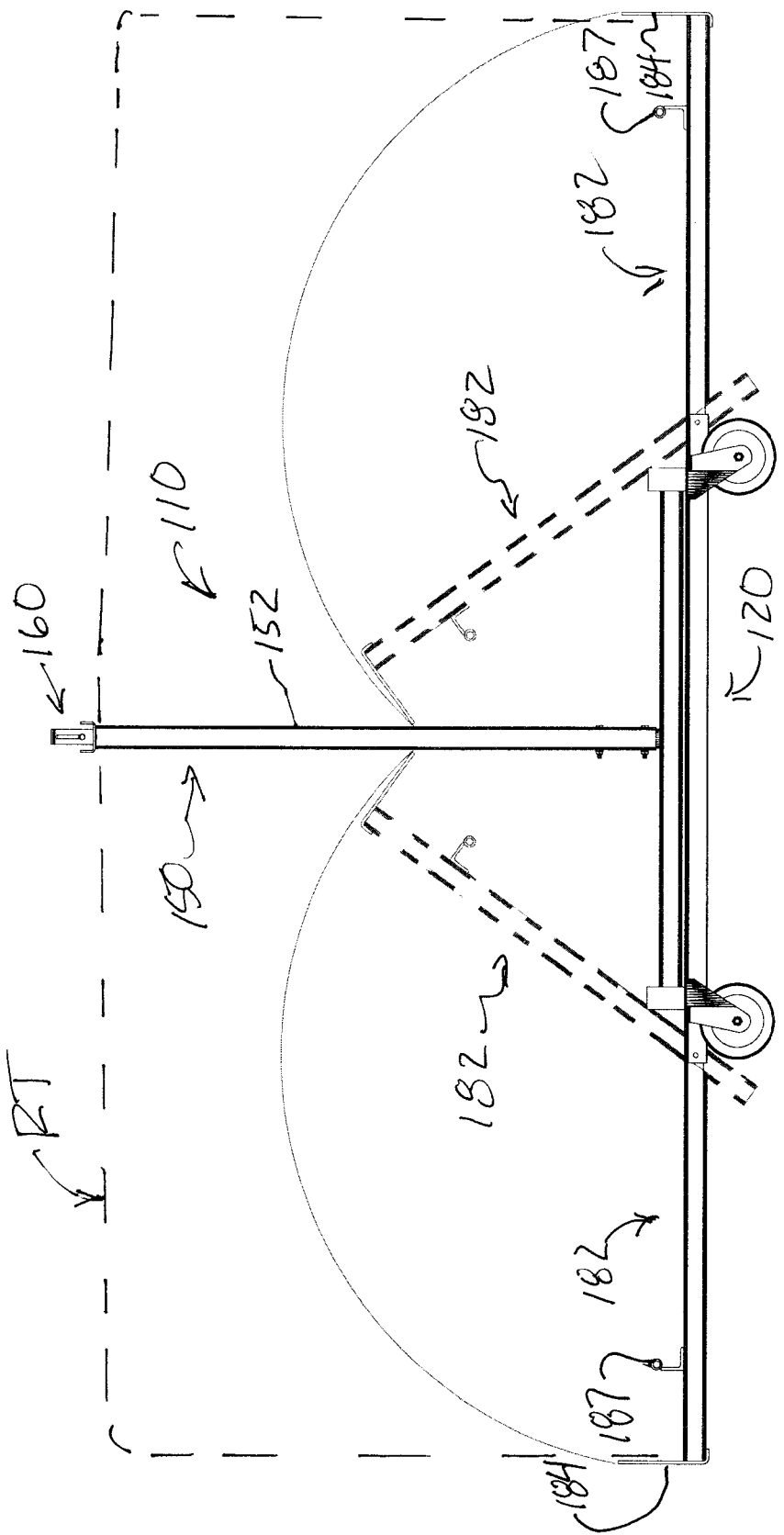
FIG. 10 is a side view of a second embodiment of the table cart that is adapted for accommodating long, rectangular tables.
Figure 11:
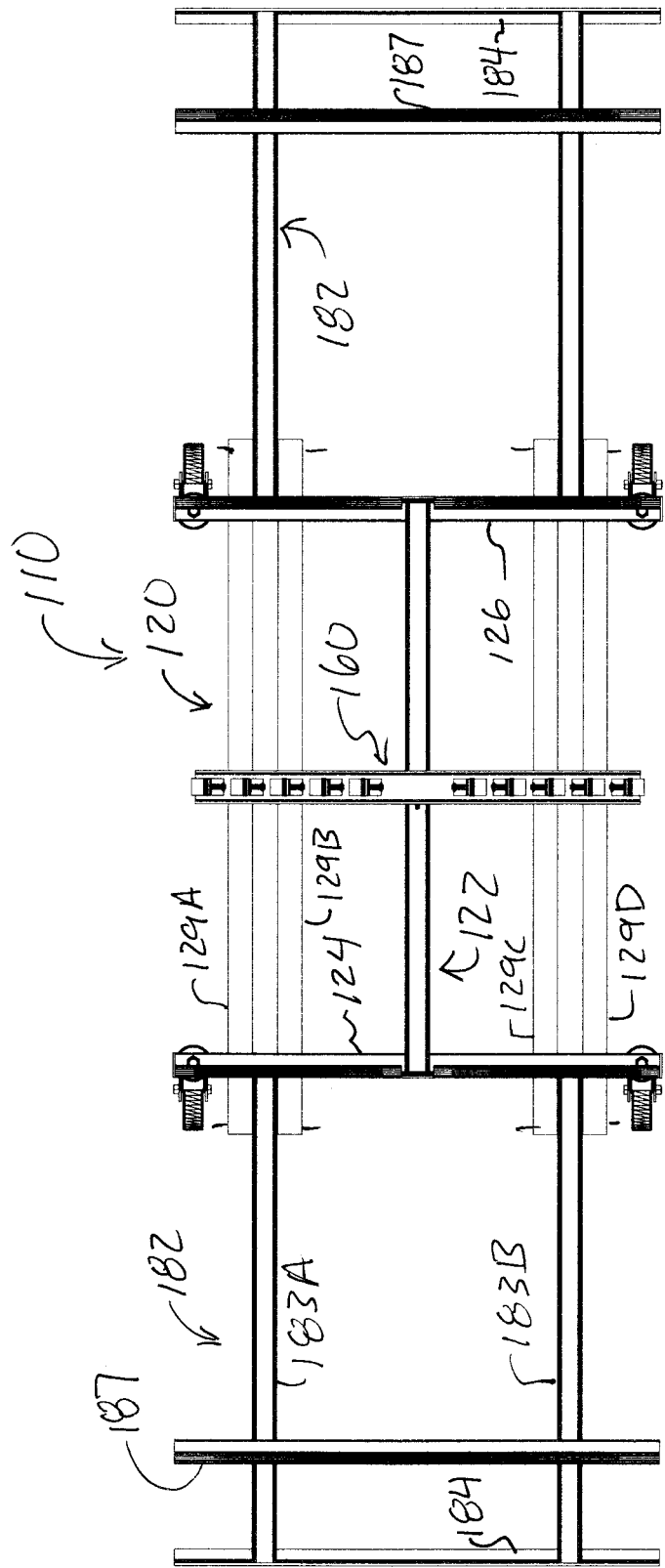
FIG. 11 is a top view of a second embodiment of the table cart that is adapted for accommodating long, rectangular tables.

FIG. 10 provides a side view a table cart 110 which is a second embodiment for the table cart, that is adapted for receiving, securing, moving and storing rectangular folding tables RT. Table cart 110 includes a table rack 150 that supports a racking assembly 160 that is contemplated to be functionally and structurally identical to racking assembly 60 of table cart 10. The skilled reader may notice, however, that table rack 150 is not shown to include an optional handle. As can be seen in FIGS. 10 and 11, table cart 110 also includes opposite and symmetrically identical pair of pivoting outrigger assemblies 182. In this example, these pivoting assemblies pivot between a storage position shown in dashed lines in FIG. 10 and an extended position suitable for supporting and laterally securing a rectangular table RT (or several rectangular tables RT) which is indicated with dashed lines in FIG. 10. When in the storage position, the distal ends of outrigger assemblies 182 lean against upright member 152. When in the extended position, outrigger assemblies 182 lock into a horizontal position and provide additional, lateral support for sets of rectangular tables RT that are arranged on table cart 110. The skilled reader will note that additional padded members 187, similar to padded members 24P and 26P described above, provide lateral support for rectangular tables RT. Still further, a pair of end stops 184 are mounted at the distal ends of outrigger assemblies 182. End stops 184 are arranged to secure the ends of rectangular tables RT which are indicated with a dashed outline so that tables RT are secured from sliding laterally as table cart 110 is pushed and moved about.

Accordingly, given the above detailed description of table cart 10 and table cart 110, the skilled reader is able to appreciate that both embodiments provide an easy to use, convenient and safe apparatus for storing and moving sets of folding tables.

It is to be understood that while certain forms of this invention have been illustrated and described, it is not limited thereto, except in so far as such limitations are included in the following claims and allowable equivalents thereof.

The invention claimed is:

1. A cart for folding tables, comprising:
a base and a table rack,
the base including a longitudinal member having opposite ends and two end members that are fixed to the opposite ends of the longitudinal member,
the table rack including an upright member that is mounted to the longitudinal member of the base and a table racking assembly that includes a horizontal rack member that is parallel to the longitudinal member of the base, and a plurality of tabs, the table racking assembly being mounted to the upright member at the upper end of the upright member, the plurality of tabs of the horizontal rack member being slidably and frictionally mounted to the horizontal rack member, the plurality of tabs being able to slide vertically between a first raised retracted position and a second extended lowered position, the first raised retracted position being a position in which each corresponding tab is not able to block an upper edge of a folding table as it passes below the corresponding tab, and, the second extended lowered position being a position in which the tab is able to block the passage of the upper edge of the folding table, whereby, after each folding table is placed in an upright racked position and moved under at least one tab, the last respective tab that the folding table passes under may then be manually urged from the first retracted raised position to the second extended lowered position so that the upper edge of the folding table is secured from tilting movement away from the upright racked position,
the table rack being further arranged so that an elevation of the table racking assembly is able to be changed in order to adjust the table rack to be able to secure from tilting movement a first plurality of folding tables which all have a first width or diameter and also adjusted to accommodate a second plurality of folding tables which all have a second width or diameter.

2. The table cart of claim 1 wherein;
the base is supported by wheels for rolling movement of the table cart.

3. The table cart of claim 1 wherein;
the at least one horizontal member of the table rack having a series of slots, each slot being arranged for passage of each corresponding tab between the first, raised position and the second lowered position, and each tab being slidably and frictionally mounted to the at least one horizontal member.

4. The table cart of claim 3 wherein;
each tab further includes a vertical slot and a spring biased fastener that is mounted through the slot and also at least indirectly mounted to the horizontal member, the spring biased fastener providing a sliding and frictional mounting of each tab to the horizontal member so that the tab may be frictionally slid between the first raised position and the second lowered position and so that once placed in a selected either one of the raised and lowered positions, the tab remains in the selected position unless subsequently manually urged to another position.

5. The table cart of claim 1 wherein,
the base includes folding assemblies that fold between a first retracted position and a second laterally extended position, and wherein such folding assemblies are arranged for further supporting rectangular tables.

6. The table cart of claim 4 wherein,
the base includes folding assemblies that fold between a first retracted position and a second laterally extended position, and wherein such folding assemblies are arranged for further supporting rectangular tables.

7. A cart for folding tables, comprising:
a base and a table rack,
the base including a longitudinal member having opposite ends and two end members that are fixed to the opposite ends of the longitudinal member,
the table rack including an upright member and a table racking assembly, that includes a horizontal rack member that is parallel to the longitudinal member of the base, the upright member being fixed to the longitudinal member of the base at a location that is between the end members of the base, the table racking assembly being mounted to an upper end of the upright member and also being horizontal and parallel to the end members of the base, the upright member further including a first portion that is fixed to the longitudinal member of the base and a second portion that is supported by the first portion and that is able to be adjusted in a vertical direction between a first bottom position and a second top position,
the table racking assembly being fixed to the second portion such that the elevation of the table racking assembly is able to be adjusted between a first bottom position and a second top position,
the table racking assembly further including a plurality of tabs that are movably mounted to the horizontal rack member, the plurality of tabs being able to move between a first raised position and a second lowered position, the first raised position being a position in which each corresponding tab is not able to block an upper edge of a folding table as it passes below the table racking assembly, and, the second lowered position being a position in which each corresponding tab is able to block the passage of the upper edge of the folding table from passing under each corresponding tab, whereby, after each folding table is placed in an upright racked position and moved under at least one tab, the last respective tab that the folding table passes under may then be manually urged from the first raised position to the second lowered position so that the upper edge of the folding table is secured from tilting movement away from the upright racked position, whereby a first set of folding tables having the same width or diameter may be arranged and secured on the cart by using the plurality of tabs of the racking assembly the elevation of which being set to correspond to the first set of tables and whereby at least a second set of folding tables having a width or diameter that varies from that of the first set of tables may also be arranged and secured on the cart and secured by using the plurality of tabs of the racking assembly the elevation of which being set to correspond to the second set of tables.

\* \* \* \* \*